US012775433B2

(12) United States Patent
Mundkur

(10) Patent No.: US 12,775,433 B2
(45) Date of Patent: Oct. 27, 2026

(54) POWER-OVER-ETHERNET COMPUTER SYSTEM WITH MULTIPLE DISPLAYS THAT UTILIZES A MULTI-STREAM TRANSPORT PROTOCOL TO PROVIDE BOTH POWER AND DATA TO THE DISPLAYS

(71) Applicant: Jagdish Ramesh Mundkur, Yardley, PA (US)

(72) Inventor: Jagdish Ramesh Mundkur, Yardley, PA (US)

( * ) Notice: Subject to any disclaimer, the term of this patent is extended or adjusted under 35 U.S.C. 154(b) by 0 days.

(21) Appl. No.: 18/983,312

(22) Filed: Dec. 16, 2024

(65) Prior Publication Data

US 2025/0117179 A1 Apr. 10, 2025

Related U.S. Application Data

(63) Continuation-in-part of application No. 18/310,519, filed on May 1, 2023, now Pat. No. 12,373,010, which is a continuation-in-part of application No. 18/131,352, filed on Apr. 5, 2023, now Pat. No. 12,360,775.

(51) Int. Cl.

| | |
|---|---|
| ***H04B 10/80*** | (2013.01) |
| ***G02B 6/42*** | (2006.01) |
| ***G06F 1/26*** | (2006.01) |
| ***G06F 3/14*** | (2006.01) |
| ***H04L 12/10*** | (2006.01) |
| ***H04N 21/443*** | (2011.01) |
| ***H04Q 11/00*** | (2006.01) |

(52) U.S. Cl.
CPC .............. *G06F 3/1446* (2013.01); *G06F 1/26* (2013.01)

(58) Field of Classification Search
None
See application file for complete search history.

(56) References Cited

U.S. PATENT DOCUMENTS

| | | | |
|---|---|---|---|
| 7,155,622 | B2 | 12/2006 | Mancey et al. |
| 7,706,392 | B2 | 4/2010 | Ghoshal et al. |
| 7,941,677 | B2 | 5/2011 | Penning |
| 8,310,089 | B2 | 11/2012 | Schindler et al. |
| 9,880,598 | B2 | 1/2018 | Luerkens et al. |
| 11,411,293 | B1 | 8/2022 | Putman et al. |
| 2004/0148060 | A1 | 7/2004 | Lee |
| 2006/0117089 | A1 | 6/2006 | Karam |

(Continued)

FOREIGN PATENT DOCUMENTS

| | | |
|---|---|---|
| CN | 101834755 | 9/2010 |
| CN | 207283589 | 4/2018 |

(Continued)

*Primary Examiner* — Carl Adams
(74) *Attorney, Agent, or Firm* — LaMorte & Associates P.C.

(57) ABSTRACT

A computer system having a microprocessor that receives a PoE cable and receives a mixed power/data signal. A splitter circuit separates the mixed power/data signal into a DC power signal and data signals. The microprocessor generates display signals. The display signals and the unused portion of the DC power signal are sent to daisy-chained display monitors. The display monitors are powered and operated by the DC power signal and the display signals. The display signals are addressed to different monitors in an MST format.

16 Claims, 3 Drawing Sheets

(56) References Cited

U.S. PATENT DOCUMENTS

| | | | | |
|---|---|---|---|---|
| 2007/0170909 | A1 | 7/2007 | Vorenkamp et al. | |
| 2007/0260904 | A1 | 11/2007 | Camagna et al. | |
| 2007/0288784 | A1 | 12/2007 | Koper et al. | |
| 2008/0067871 | A1 | 3/2008 | Black et al. | |
| 2008/0068519 | A1 | 3/2008 | Adler et al. | |
| 2010/0052421 | A1 | 3/2010 | Schindler et al. | |
| 2010/0223480 | A1 | 9/2010 | Fratti et al. | |
| 2012/0265361 | A1 | 10/2012 | Billingsley et al. | |
| 2013/0173937 | A1 | 7/2013 | Lee | |
| 2013/0307323 | A1 | 11/2013 | Hasenei | |
| 2016/0028655 | A1 | 1/2016 | Alsup | |
| 2016/0041573 | A1 | 2/2016 | Chen et al. | |
| 2016/0132086 | A1 | 5/2016 | Hong | |
| 2016/0370835 | A1 | 12/2016 | Erickson et al. | |
| 2017/0220101 | A1 | 8/2017 | Brooks et al. | |
| 2018/0375672 | A1 | 12/2018 | Thiers et al. | |
| 2019/0180586 | A1 | 6/2019 | Script | |
| 2020/0126476 | A1* | 4/2020 | Joo | G09G 3/20 |
| 2021/0241705 | A1* | 8/2021 | Frederick | G09G 5/14 |
| 2021/0247832 | A1 | 8/2021 | Roy et al. | |
| 2022/0052767 | A1* | 2/2022 | Sipes, Jr. | G02B 6/3817 |
| 2022/0262530 | A1 | 8/2022 | Mansfield et al. | |
| 2023/0269107 | A1 | 8/2023 | Song et al. | |

FOREIGN PATENT DOCUMENTS

| | | |
|---|---|---|
| CN | 109617039 | 2/2021 |
| DE | 102006036770 | 2/2008 |
| EP | 1 708 409 | 10/2006 |
| EP | 3021212 | 5/2016 |
| JP | 2007088809 | 4/2010 |
| JP | 2011103034 | 5/2011 |

* cited by examiner

POWER-OVER-ETHERNET COMPUTER SYSTEM WITH MULTIPLE DISPLAYS THAT UTILIZES A MULTI-STREAM TRANSPORT PROTOCOL TO PROVIDE BOTH POWER AND DATA TO THE DISPLAYS

RELATED APPLICATIONS

This application is a continuation-in-part of co-pending U.S. patent application Ser. No. 18/310,519, filed May 1, 2023, which is a continuation-in-part of co-pending U.S. patent application Ser. No. 18/131,352, filed Apr. 5, 2023.

BACKGROUND OF THE INVENTION

1. Field of the Invention

In general, the present invention relates to Power-over-Ethernet (POE) systems that provide both power and data to electronic devices. More particularly, the present invention relates to low powered computers with microprocessors and one or more displays that are designed for use in a PoE system, wherein the computer is powered by an incoming PoE cable and the displays are powered from the computer.

2. Prior Art Description

As electronics and programming become more sophisticated in a widening array of devices, an ever-increasing number of devices have the ability to exchange data with a local area network (LAN). Exchanging data with a LAN can be accomplished either wirelessly or by using a cable connection to an Ethernet network. If a cable connection is used, the cable is typically a twisted pair cable, such as a Cat5 cable, a Cat5e cable, or a Cat6 cable.

Traditional devices that connect to an Ethernet network require a wiring infrastructure that contains both a power cable and an Ethernet cable. The power cable provides AC power to the device. If the device is a computer that uses separate display monitors, power cables must also be provided for each of the display monitors. As such, the simple installation of a desktop computer requires an Ethernet cable, a power cable for the computer, and separate power cables for each of the display monitors connected to the computer. Furthermore, additional data cables must be used to connect the various display monitors to the data ports of the computer. Providing power cables, monitor data cables, and an Ethernet cable is not always practical or convenient. Accordingly, in the prior art, different protocols have been developed to reduce the number of power cables and data cables needed to set up and run a computer. For example, multi-stream transport (MST) protocols were developed to reduce the number of cables required between a computer and multiple display monitors.

MST protocols were developed in 2009 and first implemented in the DisplayPort 1.2 standard in 2010. MST protocols give a source equipped with DisplayPort technology the ability to transmit video to multiple displays over a single cable. It can be utilized by transmitting the video to an MST-compatible hub, which then disseminates the video to the connected displays. Alternatively, MST protocols can be used to transmit video to a single display monitor, which then transmits the video down another cable to the next display in a daisy chain of display monitors. The primary limitation with using MST protocols is that only data is transmitted. Each display monitor still requires its own power cable. As such, each display monitor still requires an incoming data cable and a separate incoming power cable.

The number of cables that lead into the computer itself can be reduced using a Power-over-Ethernet (POE) system. PoE systems provide both electrical power and data communications over an Ethernet cable. In this manner, only one Ethernet cable needs to be provided at a particular location. Furthermore, the electrical power provided via the Ethernet cable is direct current (DC). As such, the need for an AC/DC converter is eliminated and the overall electronics package can be made smaller.

There are several common techniques for transmitting power over Ethernet cabling. Some of them have been standardized by the Institute of Electrical and Electronics Engineers (IEEE) standard IEEE 802.3. These most common standards are known as alternative A, alternative B, and 4PPoE. Of the three standardized types, 4PPoE, also known as PoE++, has the ability to provide the most power to a device. The IEEE standard for a 4PPoE system can handle up to 100 watts of power at the source and 71.3 watts at the load. This enables the 4PPoE cable to extend up to 100 meters. The voltage limit is between 52 volts and 75 volts at the source and between 41.1 volts and 57 volts at the load. The maximum current that can be transmitted is 960 mA per twisted wire pair within the Ethernet cable. Most Ethernet cables utilize thin wire that is between 24 AWG and 26 AWG. As such, the wire can rapidly heat if the maximum current limit is surpassed. Given the voltage and current limitations of a 4PPoE system, only certain types of electronic devices are eligible for use with the system. The devices must be able to operate using DC voltage and draw no more than 71.1 watts during all phases of operation. Since this limit is the maximum, the actual limit used in industry is at least ten percent less, or approximately 64 watts, to account for some margin of error.

It is highly impractical to utilize a PoE system to operate a computer if the display monitors used by the computer still require standard power cables. Rather, there is a need for a POE computer system that receives power and data through a single Ethernet and can then generate its own combined power and data signal that can be sent to display monitors using a modified multi-stream transport system. In this manner, the computer and each of the display monitors need only receive one cable. This need is met by the present invention as described and claimed below.

SUMMARY OF THE INVENTION

The present invention is a computer system for use in a Power-over-Ethernet (POE) application that provides a mixed power/data signal to the computer system via a PoE cable. The system utilizes a computer unit having a microprocessor, an input port, and an output port. The input port receives the PoE cable and provides the mixed power/data signal to the computer unit. The computer unit contains a splitter circuit that separates the mixed power/data signal into a DC power signal and data signals. The microprocessor in the computer unit receives the data signals and generates display signals. The computer unit directs the DC power signal and the display signals to the output port.

A first display monitor is provided having an input port that is linked to the output port of the computer unit with a first transfer cable that has USB-C terminations. The first transfer cable carries both the DC power signal and the display signals. The first display monitor contains a multi-stream transport circuitry that acts as a MST hub and differentiates between display signals addressed to the first display monitor and display signals addressed to the subsequent display monitor(s). The first display monitor directs the DC power signal unused by the first monitor and the display signals addressed to the subsequent display monitor (s) to a second output port.

A second transfer cable with USB-C terminations connects to the second output port and directs the DC power signal unused by the first monitor and the display signals addressed to the subsequent display monitor to the subsequent display monitor. The process continues in a daisy chain until all the display monitors are provided with the DC power signal and the display signals addressed to that display monitor.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system and methodology can be embodied in many ways, only one exemplary embodiment is illustrated. The exemplary embodiment is being shown for the purposes of explanation and description. The exemplary embodiment is selected in order to set forth one of the best modes contemplated for the invention. The illustrated embodiment, however, is merely exemplary and should not be considered as limitations when interpreting the scope of the appended claims.

Figure 1:
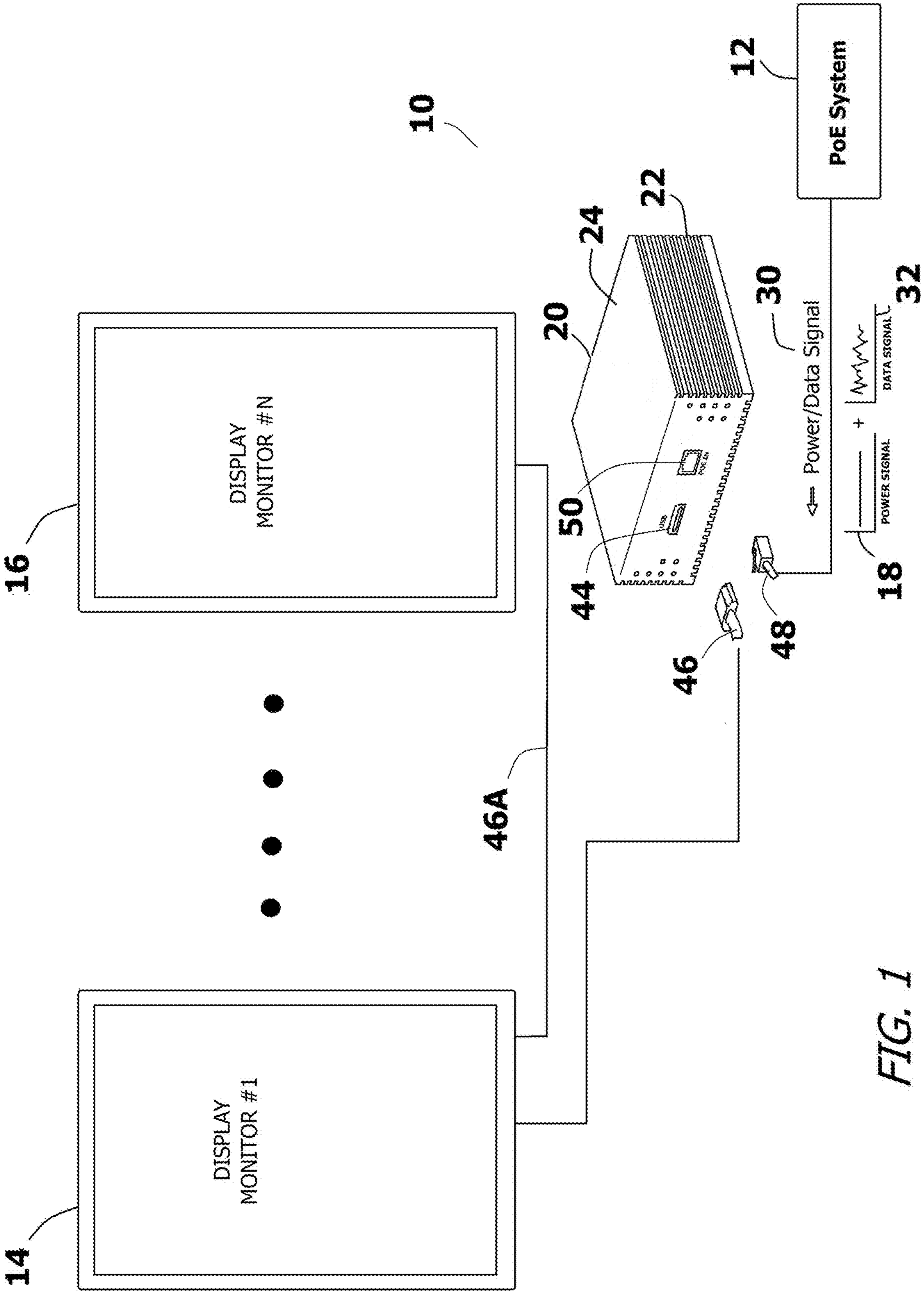
FIG. 1 shows an exemplary embodiment of a powered device in the form of a low power computer unit that has multiple display monitors.

Referring to FIG. 1, a computer system 10 is shown. The computer system 10 is designed to operate as part of an existing PoE system 12. The exemplary computer system 10 being shown contains a plurality of display monitors 14, 16. Although two display monitors are shown, it will be understood that other pluralities of display monitors can be used, provided the sum of the power requirements does not surpass that being provided by the PoE system 12. Such computer systems can be used as personal computers. However, such computer systems are commonly used to control display monitors in airports, train stations, offices, restaurants, and the like. In such applications, the computer system 10 is used to operate signage that is mounted to a wall or to an overhead display.

The display monitors 14, 16, are DC "dumb" monitors. That is, the display monitors 14, 16, operate directly from an incoming DC power signal 18 and do not contain power cords or AC/DC converter circuitry. The preferred display monitors 14, 16 are power efficient Thinlabs® display monitors that operate using approximately 8 watts of power each. The display monitors 14, 16 depend on a separate low power computer unit 20 for processing. Each of the display monitors 14, 16 act as a simple input/output device when connected directly to a low power computer unit 20. It will be understood that different types of display monitors can be used. If the display monitors selected are 27 inch 4K monitors, the display monitors may have a maximum power consumption of up to 22 watts with a normally operating power consumption well below 20 watts. As stated, for the standard Full HD 24 inch display monitors the power consumption is around 8 watts. All the display monitors are manufactured by ThinLabs®. Other commercially available low power 4K display monitors do not have power ratings under 35 watts.

The low power computer unit 20 is specifically designed to operate within the PoE system 12. The low power computer unit 20 is very small, having a shell housing 24 with an internal capacity of between 50 cubic inches and 100 cubic inches. This small size enables the low power computer unit 20 to be mounted to walls, ceilings, and even in junction boxes in an unobtrusive manner. The low power computer unit 20 does not have any integrated user interface, such as a keyboard or mouse. Separate battery powered keyboards and mouse devices can be linked to the low power computer unit 20 using Bluetooth® connections. Furthermore, the low power computer unit 20 contains no fans, peripheral drives, doors or other peripheral devices that consume power but are not directly required to operate the display monitors 14, 16. Rather, the shell housing 24 of the low power computer unit 20 is made of aluminum, or another highly heat conductive material. The shell housing contains heat fins 22 that act as the heat sink and cool the low power computer unit 20.

Figure 2:
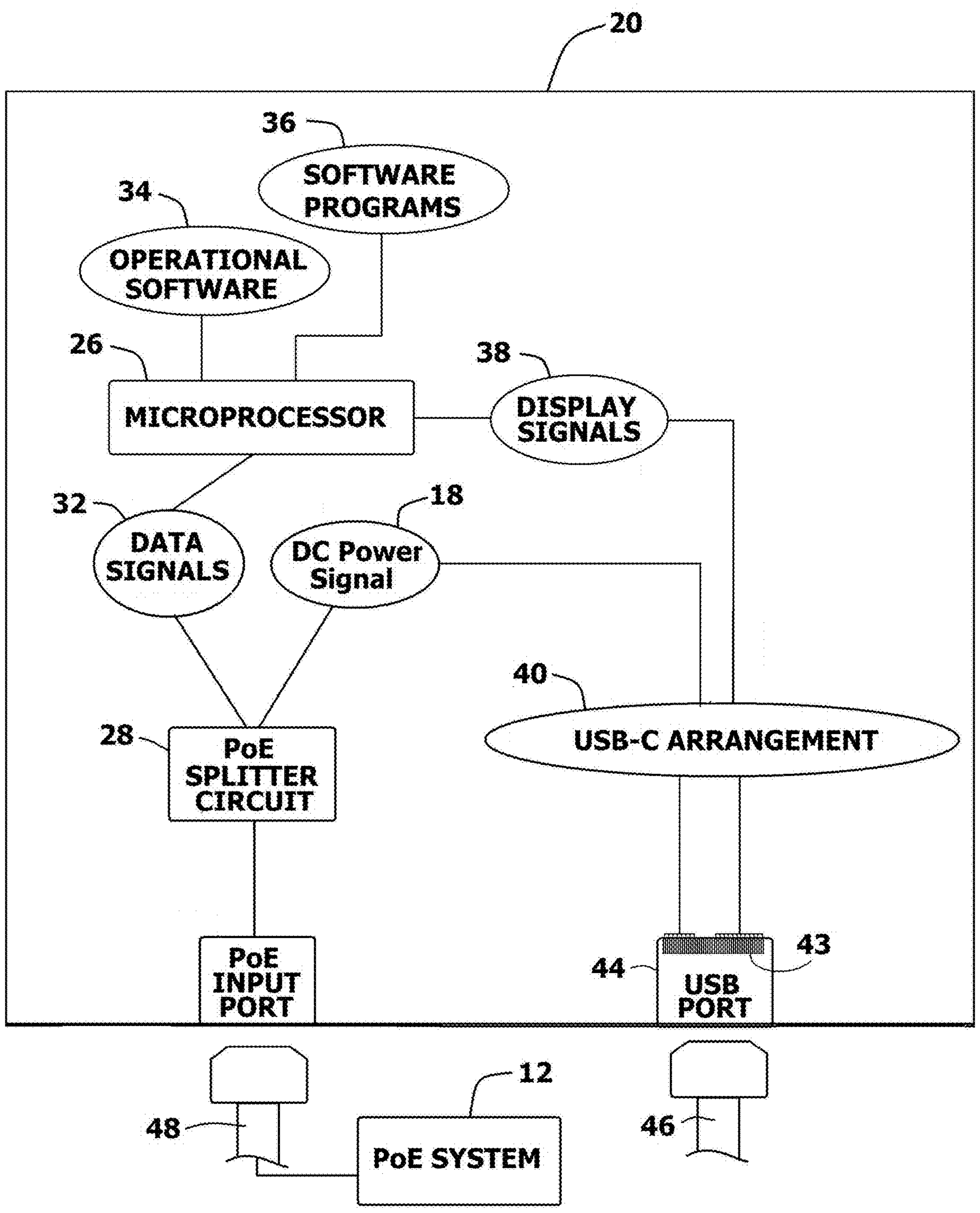
FIG. 2 is a schematic showing the relevant components of the computer unit needed for the present invention.

Referring to FIG. 2 in conjunction with FIG. 1, it will be understood that within the low power computer unit 20, there is a microprocessor 26 and various dedicated circuits. One dedicated circuit is a PoE splitter circuit 28. The PoE system 12 provides a mixed power/data signal 30 to the low power computer unit 20. The mixed power/data signal 28 contains the DC power signal 18 and a data signal 32. The PoE splitter circuit 28 separates the DC power signal 18 from the data signal 32.

The microprocessor 26 is a commercially available processor capable of running operating software 34 and various downloaded software programs 36. The microprocessor 26 is powered by the DC power signal 18 that was separated from the mixed power/data signal 30. The operating software 34 and/or downloaded software programs 36 generate display signals 38 for the display monitors 14, 16. The display signals 38 can be generated by the microprocessor 26 with or without the use of the data signal 32 split from the PoE cable 48.

The display signals 38 are produced in a DisplayPort® 1.2 or better MST protocol. This enables multiple audio/video signals to be combined for use in the daisy chain arrangement of the display monitors 14, 16. Once in an MST protocol, the display signals 38 and the DC power signal 18 are set into a USB-C arrangement 40. That is, the display signals 38 and the DC power signals 18 are directed to various pins 43 of an output USB-C port 44 that is configured to receive a transfer cable 46 terminated with USB-C connectors. A USB-C connectors on the transfer cable 46 each have twenty-four pins. The pins are divided among power pins, ground pins, and signal pins. Accordingly, some of the pins 43 in the USC-C cable carry the display signals 38 and other pins 18 carry the DC power signal 18. The wires used in the transfer cable 46 have a conductivity rating and gauge sufficient to transfer the DC power signal 18 without significant loss of current. Likewise, the wires in the transfer cable 46 used to transfer the display signals have conductivity ratings and gauge sufficient to transfer data at least five meters and preferably up to ten meters without significant degradation of signal.

The transfer cable 46 is required to link the output USB port 44 to the first display monitor 14. Traditionally, a DisplayPort® cable is used on display monitors that are in a daisy chain arrangement. However, a DisplayPort® cable cannot be used because such a cable is limited in power capacity and cannot support more than 3 watts of power delivery. This is inadequate for the power requirements of the multiple display monitors 14, 16. The preferred power requirements of the display monitors 14, 16 is approximately 8 watts for a ThinLabs® Full HD 24 inch monitors. As such, the first transfer cable 36 must be able to carry 16 watts. Given safety margins, this requires the first transfer cable to be rated for at least 20 watts. It will be understood that if more than two display monitors are used or if larger display monitors are used, a higher rated transfer cable would be provided.

In the present invention computer system 10, not only are the display signals 38 daisy chained among the display monitors 14, 16, but the DC power signal 18 is also. The display signals 38 created by the microprocessor 26 are produced in the DisplayPort protocol. These display signals 38 are then forwarded with the DC power signal 18 to the first display monitor 14 though different pins 43 of the transfer cable 46. The USB-C cable 46 is capable of carrying the DC power signal 18 at the wattage needed to operate the downstream display monitors 14, 16. As such, each display monitor 14, 16 is provided with a USB input port 50 to receive both the data signals 38 and the DC power signal 18 from the USB-C cable 46.

The first USB-C cable 46 connects the first display monitor 14 to the USB output port 44 of the low cost computer unit 20. Subsequent USB-C cables 46A are used to daisy chain the display monitors 14, 16. As such, each display monitor 14, 16 has only one incoming cable that provides both data and power to that display monitor.

Figure 3:
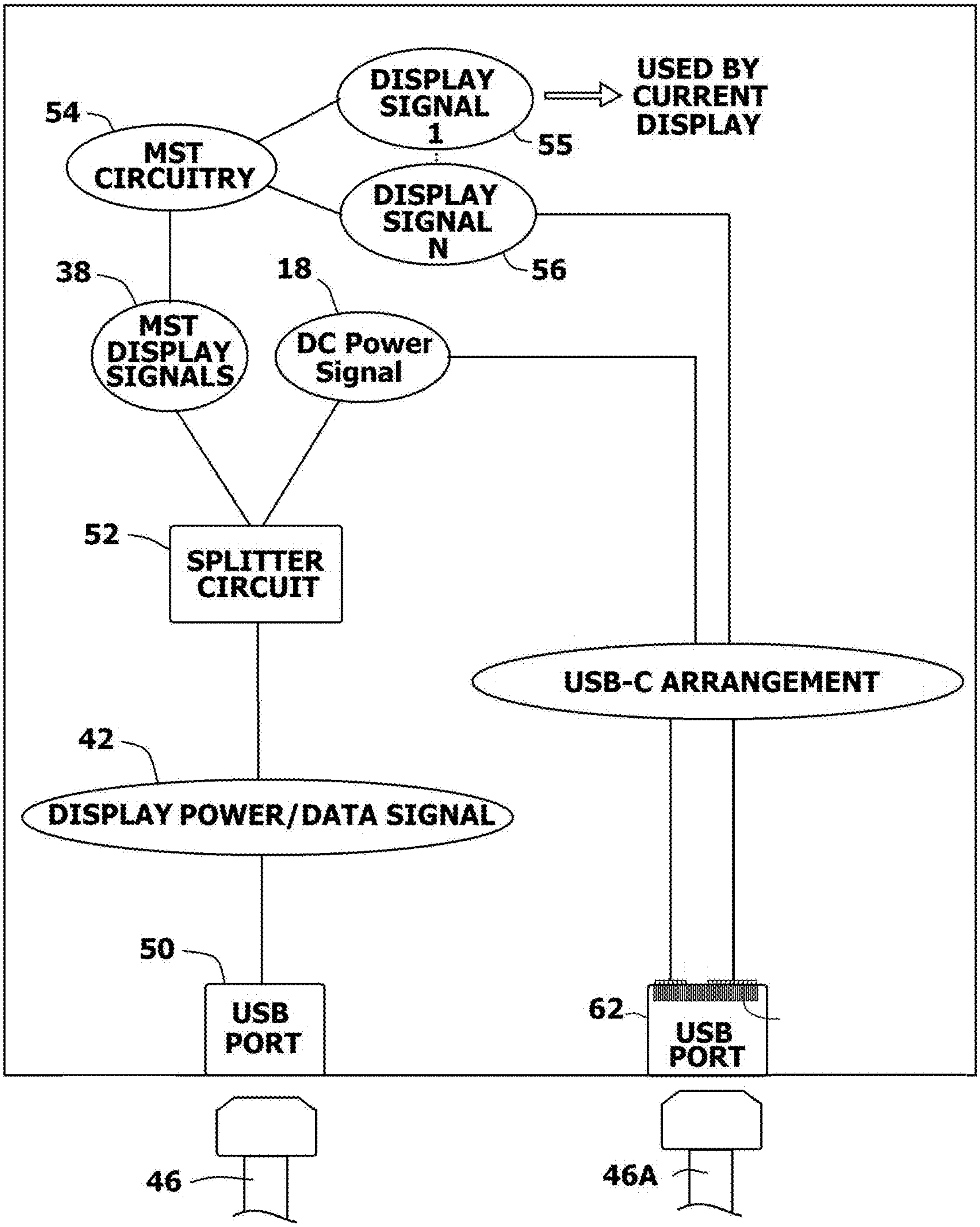
FIG. 3 is a schematic showing the relevant components of a display monitor needed for the present invention.

Referring to FIG. 3 in conjunction with FIG. 2 and FIG. 1, the first display monitor 14 is shown. It will be understood that the first display monitor 14 and subsequent display monitors 16 have the same structure. Each display monitor 14, 16 has the USB input port 50 that receives the incoming transfer cable 46 with USB-C terminations. Within each display monitor 14, 16, the USB input port 50 has some pins that carry the incoming display signals 38, and other pins that carry the DC power signal 18. The display signals 38 are directed to an MST circuitry 54 which can be a MST hub, or function the same manner as a MST hub. The MST circuitry 54 disseminates the display signals 38 into monitor specific signals 55, 56. The monitor specific signal 55 addressed to the first display monitor 14 is utilized by the first display monitor 14. The monitor specific signal 56 intended for the subsequent display monitor 16 is again directed to pins within a USB-C output port 62. Likewise, the unused portion of the DC power signal 18 is directed to other pins within the USB-C output port 62. A subsequent transfer cable 46A with USB-C terminations is then used to daisy chain the monitor specific signal 56 and the remaining power signal 18 to the subsequent display monitor 16. This process is repeated in each display monitor until a data signal and a power signal reaches the last of the display monitors in the daisy chain.

The starting times of the low power computer unit 20 and the display monitors 14, 16 are staggered. Instead of starting the low power computer unit 20 and the display monitors 14, 16 all at the same time, the startup of these components is choreographed so that the wattage drawn at any one time is below the maximum threshold of rating of the PoE system 12. The delays embodied within the staggered start can be controlled by being elongated or shortened. In this manner, the system can be tuned to the requirements of a particular system or to changes in regulations. For example, in a 4PPoE system, the maximum power rating is just over 71 watts. Some building codes may require a safety factor of ten percent, resulting in a maximum wattage of approximately 64 watts. This recommended safety factor may be different in other states or may be updated over time to fifteen percent or twenty percent, for example. Such changes can be accommodated by elongating the overall startup sequence. Likewise, display monitors may break and be replaced with newer display monitors that may draw more or less power than the original display monitor.

The first component to begin to power up is the low power computer unit 20. Since the low power computer unit 20 has no fans, no peripherals, and no AC/DC power converters, the low power computer unit 20 can boot up with a peak power draw of under 50 watts and an average operational draw of approximately 20 watts+/−5 watts depending upon the microprocessor 26 selected. Each of the display monitors 14, 16 may require up to 20 watts at startup, but each rapidly reduces its power needs to approximately 10-15 watts depending upon display monitor size and resolution.

From the above description, it will be understood that a computer unit 20 containing multiple display monitors 14, 16, or other powered components, can be powered on and operated from a single PoE cable 48, even if the combined peak power requirements of all the components exceeds the power rating of the PoE system 12. This is accomplished by setting a maximum wattage threshold and staggering the startup of the various components. Furthermore, by using a MST protocol, the protocoled data signals for each of the display monitors can be combined. The display signals in the MST protocol and the DC power signal 18 can all be transmitted over a transfer cable.

It will be understood that the exemplary embodiment of the present invention system that is illustrated is merely exemplary and that many aspects of the system can be redesigned in manners that are functionally equivalent. All such variations, modifications and alternate embodiments are intended to be included within the scope of the present invention as claimed.

What is claimed is:

1. A computer system for use in a Power-over-Ethernet application that provides a mixed power/data signal to the computer system via a PoE cable, said computer system comprising:

a computer unit having a microprocessor, an input port, and an output port, wherein said input port receives said PoE cable and said mixed power/data signal, wherein said computer unit contains a splitter circuit for separating said mixed power/data signal into a DC power signal and data signals, wherein said microprocessor receives said data signals and generates display signals, wherein said computer unit directs said DC power signal with said display signals to said output port;

a first display monitor having an input port that is linked to said output port of said computer unit with a first transfer cable, wherein said first display monitor contains multi-stream transport circuitry that differentiates between display signals addressed to said first display monitor and display signals addressed to said subsequent display monitor, wherein said first display monitor directs said DC power signal unused by said first monitor and said display signals addressed to said subsequent display monitor to a second output port; and a second transfer cable that connects to said second output port and directs said DC power signal unused by said first monitor and said display signals addressed to said subsequent display monitor to said subsequent display monitor;

wherein said first display monitor and said subsequent display monitor follow a staggered start procedure where said computer unit, said first display monitor, and said subsequent display monitor power up at different times.

2. The computer system according to claim 1, wherein said first transfer cable and said second transfer cable have USB-C terminations.

3. The computer system according to claim 1, wherein said computer unit, said first display monitor and said subsequent display monitor are all powered by said DC power signal.

4. A computer system for use in a Power-over-Ethernet application that provides a mixed power/data signal to the computer system via a single PoE cable, said computer system comprising:

a plurality of display monitors;

a computer unit having a microprocessor and a first splitter circuit, wherein said first splitter circuit receives said mixed power/data signal and separates a DC power signal and data signals from said mixed power/data signal, wherein said microprocessor receives said data signals and generates display signals, wherein said computer unit forwards said DC power signal and said display signals to said plurality of display monitors to power and operate said plurality of display monitors using a staggered start procedure where each of said plurality of display monitors powers up at a different time.

5. The computer system according to claim 4, wherein said display monitors are arranged in a daisy chain.

6. The computer system according to claim 4, wherein said display signals are addressed to different display monitors within said plurality of display monitors.

7. The computer system according to claim 4, wherein said computer unit and said plurality of display monitors are all powered by said DC power signal.

8. The computer system according to claim 4, wherein said computer unit and said plurality of display monitors are connected with only transfer cables that have USB-C terminations.

9. The computer system according to claim 4, wherein said display signals are in a multi-stream transport protocol.

10. The computer system according to claim 4, wherein the plurality of display monitors includes a first display monitor that contains circuitry that differentiates between display signals addressed to said first display monitor and display signals addressed to other of said plurality of display monitors.

11. The computer system according to claim 10, wherein said first display monitor forwards said DC power signal unused by said first monitor and said display signals addressed to said other of said plurality of display monitors to said other of said plurality of display monitors.

12. A computer system for use in a Power-over-Ethernet application that provides a first mixed power/data signal to the computer system via a PoE cable, said computer system comprising:

a plurality of display monitors interconnected in a daisy chain arrangement;

a computer unit that separates said mixed power/data signal into a DC power signal and data signals from said mixed power/data signal, wherein said computer unit generates display signals in a multi-stream transport format and forwards said display signals with said DC power signal to said plurality of display monitors;

wherein said DC power signal powers said plurality of monitors with a staggered start procedure where each of said plurality of monitors are power up at different times.

13. The computer system according to claim 12, wherein said display signals are addressed to different display monitors within said plurality of display monitors.

14. The computer system according to claim 12, wherein said DC power signal and said display signals are transmitted through a transfer cable with USB-C terminations from said computer unit to said plurality of display monitors.

15. The computer system according to claim 12, wherein said plurality of display monitors includes a first display monitor with circuitry that differentiates between display signals addressed to said first display monitor and display signals addressed to other of said plurality of display monitors.

16. The computer system according to claim 15, wherein said first display monitor forwards said DC power signal unused by said first monitor and said display signals addressed to said other of said plurality of display monitors.

* * * * *